UNITED STATES PATENT OFFICE 2,534,078

TREATMENT OF POLYMERIC MATERIALS

Daniel E. Strain, Wilmington, Del., assignor to E. I. du Pont de Nemours & Company, Wilmington, Del., a corporation of Delaware No Drawing. Application February 22, 1945, Serial No. 579,317

4 Claims. (Cl. 260—79.3)

This invention relates to resinous compositions and more particularly to methods for curing polymeric materials containing linear, substantially saturated, hydrocarbon chains with substituent groups attached thereto.

It has been known heretofore that certain polymeric materials containing olefinic unsaturation, such as rubber and polymeric drying oils, could be cured by means of organic peroxides as vulcanizing agents. It has also been known that alkyd resins, especially drying oil-modified alkyds, could be cured in a somewhat similar manner by heating with an organic peroxide. According to U. S. Patent 2,249,498, coating materials containing acrylic resins and benzoyl peroxide, when applied to wire or other surfaces, give surfaces having improved physical and electrical properties, similar to the surfaces obtained by heating an acrylic resin coating to incipient decomposition in the absence of a peroxide.

The present invention, in contrast with the process described in U. S. Patent 2,249,498, does not pertain to coating compositions. The phenomena which have been discovered in accordance with the present invention would not have been revealed by a consideration of the coating compositions of the prior art.

It has been discovered in accordance with this invention that polymeric materials containing a substantially saturated hydrocarbon chain with groups attached thereto of the class consisting of —halogen, —SO₂ halogen,

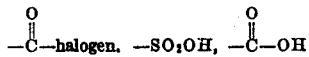

and

(R being a saturated organic radical) can be cured by the action of peroxy compounds. Moreover, when this reaction is carried out in a mold under pressure, shaped objects analogous to similar objects made from vulcanized natural rubber may be obtained. These rubber-like objects bear no resemblance to the coatings of the prior art.

The resins obtained by polymerization of monomers in the presence of peroxy compounds by heretofore known methods generally contained only very small amounts of peroxy compounds, which were not sufficient to cause curing. Even when relatively large amounts of polymerization catalyst were employed (Dittmar, U. S. Patent 2,211,089) the effect was to produce a fusible polymer of relatively low molecular weight, rather than a product which vulcanized when subjected to the action of heat. The advantages of peroxide curing are realized, according to this invention, when the polymer is preformed, and is thereafter mixed with the curing agent, and subsequently heated, or stored at ordinary temperature, until a cure is effected.

When polymeric materials are cured in accordance with this invention, a physical or chemical change occurs which is marked by various phenomena now generally recognized as being characteristic of a curing reaction. Among these phenomena are: (1) decreased solubility, (2) lessened susceptibility to distortion or melting upon the application of heat, and (3) greater snap when a stress causing deformation of the resin is applied and suddenly released. The cured products obtained by the method of the present invention are essentially insoluble in water and common organic solvents, or are very sparingly soluble. Curing is commonly referred to as "cross-linking" of the resin molecule.

When the synthetic resin to be cured is employed as an adhesive, the effect of these phenomena frequently is to improve the bond strength at elevated temperatures, and in consequence to improve the resistance of the bond (in standard plywood tests) to the effects of boiling water.

If the curing temperature is below the melting point of the uncured resin, frequently the peroxide-containing uncured resin, when heated, passes from the uncured to the cured state without intermediate fusion. This frequently occurs in the vulcanization of chlorinated derivatives of normally solid olefin polymers (cf. Example 2, below).

The polymeric materials which may be cured according to the invention include halogenated polythene, halosulfonated polythene, carboxylated polythene, acrylic and alkacrylic ester polymers and interpolymers (preferably having alkyl radicals higher than methyl in the carbalkoxy groups), chlorinated polyisobutylene, chlorosulfonated polyisobutylene, ethylene-butyl methacrylate interpolymers, chlorinated ethylene-vinyl acetate interpolymers, chlorosulfonated ethylene-vinyl acetate interpolymers, products obtained by reaction between chlorocarboxylating agents (such as phosgene) and hydrocarbon polymers, chlorinated acrylic resins, polymeric chloroacrylates, chlorination and chlorosulfonation products of polymethylenes products obtained by hydrogenation of carbon monoxide, and other such polymeric materials which, in view of the present state of the resin art, are understood to contain substantially saturated linear polymeric hydrocarbon chains with groups attached thereto of the class consisting of —Cl, —SO$_2$Cl,

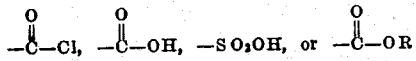

(R having the significance above stated).

The peroxy compounds which may be employed as curing agents according to the invention are exemplified by urea peroxide, benzoyl peroxide, lauroyl peroxide, acetyl peroxide, acetyl benzoyl peroxide, benzoperacid, acetoperacid, dicamphoryl peroxide, succinyl peroxide, phthalyl peroxide, tertiary butyl hydroperoxide, diethyl dioxide, ethyl percamphorate, hydroxyalkyl hydroperoxide, acetone peroxide, bis-hydroxyalkyl peroxides, and similar organic peroxides or substances which give rise to the formation of such organic peroxides under the reaction conditions.

The amount of peroxy compound employed is generally at least 1 per cent based on the weight of the polymeric material although a perceptible cure is sometimes obtained with a somewhat lesser quantity of the curing agent. The preferred amount of peroxy compound is about 1 per cent to 20 per cent for a reasonably rapid cure. The curing temperature generally should not exceed the decomposition temperature of the polymeric material, and is usually within the range of about 80° to 250° C., preferably 100° to 160° C., depending on the type of peroxide, and resin and the type of cure desired.

Any convenient method for incorporating the peroxy compound with the synthetic resin to be cured may be employed, such as milling a mixture of the resin and peroxide, or comingling in the form of molding powder solid particles containing the resin and peroxide or soaking the resin in a peroxide solution in a non-solvent for the resin, evaporation of solutions of resin and peroxide, etc.

The invention is useful in the manufacture of various articles of commerce, wherein a thermosetting resin is desired. Suitable useful applications include the manufacture of such items as moisture-proof containers; adhesives for plywood, abrasive granules, laminated glass, etc.; compressively cured impregnated paper, cloth, wood, etc.; molded articles; piping and collapsible tubing; tenting; gaskets, fittings, etc.; filaments, textiles, filter cloth; sheeting, battery separators, Venetian blinds; molding powders, with or without various fillers; elastomers, pneumatic tires, inner tubes, rubber-like articles of clothing; shoe soles and heels, bottle closures, acid-resistant caps, and the like; emulsions, latex-like compositions; electrical insulation, extruded rods and similar objects. Since many of the resins which can be peroxide-cured according to the invention have elastic properties, numerous useful purposes for which natural or earlier varieties of synthetic rubber have been employed are also served by the present invention.

The peroxide-cured methacrylic resin polymers (which term includes interpolymers) are especially valuable as adhesives for plywood. Plywood thus obtained is sufficiently resistant to the effects of boiling water to meet United States Army and Navy requirements set forth in Specification AN-NN-P-511b for aircraft plywood. Cured chlorosulfonated polythene is also an excellent plywood adhesive.

It is frequently desirable to employ, simultaneously with the peroxide-curing agent, various modifying agents, vulcanization aids, fillers, plasticizers, or the like, although these are by no means indispensable in effecting a cure when the peroxide, as above stated, is present. Agents such as polyvalent metal oxides, mercaptobenzothiazole, diphenyl guanidine, sulfur, charcoal, high-boiling phenolic compounds, may be compounded with the resin and peroxide if desired.

The time required for curing saturated polymeric materials by means of peroxy compounds varies with the nature of the polymeric material and the temperature employed. As an example, a cure may require many hours at a temperature of 100° C., yet may be effected in one hour at 150° C. Certain polymeric materials, such as interpolymers of methacrylic esters higher than methyl, are cured when heated for only a few minutes at a temperature of 120° to 125° C., or even at lower temperatures, in the presence of the peroxy compound. Radio-frequency heating may be employed if desired. Visible or ultraviolet radiation may also be employed but it is not indispensable.

The cure is generally effected under superatmospheric pressure. The use of pressure serves not only to shape the article during the cure but also to control the reactions which occur. Thus the resin may be cured under pressure either in a mold or between surfaces to be adhesively united. A convenient pressure for this purpose is about 10 to 500 pounds per square inch, although pressures up to 2,000 pounds per square inch may be employed effectively if desired. In curing acrylic and alkacrylic polymers by means of peroxy compounds, the use of superatmospheric pressure serves the purpose of suppressing undesirable reactions, which otherwise occur when such resins are heated at temperatures within the range in which curing under pressure can be effected according to this invention.

The invention is illustrated further by means of the following examples.

*Example 1.*—The following table shows the effect of heating methacrylic ester interpolymer plywood adhesives under pressure in the presence of organic peroxides. The tests were conducted by applying to the appropriate surfaces of birch veneers (thickness of panel, 0.185 inch) a 20% solution of the polymer in 95% ethanol, and thereafter laminating the plies in a hot press under the conditions stated. The adhesives to be cured contained 3% by weight of benzoyl peroxide, based on the weight of the polymer. The "boiling water test" was made by determining the shear strength after the plywood had been soaked in boiling water for 3 hours, in accordance with the aforesaid Specification AN-NN-P-511b.

*Effect of peroxide curing of methacrylic interpolymer adhesives on shear strength of three-ply birch plywood (AN–NN–P–511b)*

| | Lbs. per 1,000 Sq. Ft. of Glue Line Area | Bonding Temp., °C. | Bonding Press., Lbs. per Sq. In. | Shear Strength, Lbs. per Sq. In. | | | |
|---|---|---|---|---|---|---|---|
| | | | | Without Peroxide | | With Peroxide | |
| | | | | Dry | Boiling Water Test | Dry | Boiling Water Test |
| (1) Interpolymer, 92% n-butyl methacrylate 8% methacrylic acid | 25 | 120–125 | 200 | 585 | 50 | 670 | 235 |
| | | 130–140 | 250 | 225 | 175 | | |
| (2) Interpolymer, 45% methyl methacrylate, 45% n-butyl methacrylate, 10% n-lauryl methacrylate | 36 | 130–140 | 312 | 325 | 230 | | |
| | | 160–170 | 312 | 325 | 285 | | |
| | | 120–125 | 200 | | | 485 | 285 |
| | | 145–150 | 200 | | | 900 | 335 |
| | | 145–150 | 200 | | | 420 | 295 |
| (3) Interpolymer, 25% ethyl methacrylate 75% methyl methacrylate | 36 | 145–150 | 200 | | | 850 | 335 |

*Example 2.*—To a solution of 25 grams of uncured chloropolythene (20.8% chlorine) in 500 cubic centimeters of carbon tetrachloride was added 3 grams of lauroyl peroxide, and the mixture was saturated with phosgene. It was then irradiated for 3 days in a Pyrex vessel, by means of a 300 watt incandescent lamp. The solvent was thereafter removed from the reaction product. A sample of the resulting product was pressed between heated surfaces. It did not fuse, but became non-thermoplastic.

*Example 3.*—Chloropolythene (weight 16.9 grams) having a chlorine content of 33.1% was modified by treatment with 7.8 grams of ethandithiol in 500 cubic centimeters of benzene containing 3.0 grams of ferric chloride, at 80° for 20 hours. The non-resinous products were then removed from the mixture by steam distillation, leaving an uncured product which, after drying by milling, contained 29.0% of combined chlorine and 2.3% of combined sulfur.

Comparative vulcanization tests were made with this product to show the effect of peroxide curing. One specimen was compounded with 1% benzothiazyl disulfide, 1% Age Rite Alba (a phenolic composition manufactured by R. T. Vanderbilt Co.), 10% zinc oxide, and 3% sulfur. Another specimen was compounded with the same materials in the same quantities, except that 5% of benzoyl peroxide also was added. Both compounded specimens were placed in molds and were heated under autogenous pressure for 60 minutes at 135° C. The product which had been compounded without the peroxide remained uncured. The product which had been compounded with the peroxide had the characteristic properties of a cured elastomer, having good snap, and an elongation of 1400% at the break point.

*Example 4.*—A sample of chlorosulfonated polythene (prepared according to the general method described in the McQueen Patent U. S. 2,212,786) contained 39% combined chlorine, and 3.2% combined sulfur, present as chlorosulfonyl groups. This was compounded with 5% benzoyl peroxide and 2% magnesia and was compressively cured for 60 minutes at 175° C., yielding a cured resin which had an elongation of 210% at the break point, and which had a residual elongation of 10% after the break. A similar product is obtained when the chlorosulfonated polythene is first subjected to the action of steam, which hydrolyzes loosely bound chlorine in the chlorosulfonyl groups, leaving combined sulfur (—$SO_2OH$ groups) in the resin prior to the curing.

The vulcanization of polymeric materials by means of organic peroxides is disclosed in the following copending applications, in which I am a co-applicant: S. N. 507,874, filed October 25, 1943, now U. S. Patent 2,416,061; S. N. 519,545, filed January 24, 1944, now U. S. Patent 2,388,169; S. N. 559,652, filed October 20, 1944. A process for rendering ethylene polymer insoluble and infusible by treatment with phosgene and benzoyl peroxide is disclosed in the copending application of A. McAlevy, S. N. 480,217, filed March 23, 1943, now U. S. Patent 2,405,971. Peroxide-curing of ethylene and vinyl ester polymers is disclosed in the copending applications of W. L. Alderson, S. N. 522,804, filed February 17, 1944, now abandoned; and S. N. 541,269, filed June 20, 1944 patented April 20, 1948 No. 2,448,946; in application S. N. 541,271 of J. R. Roland, filed June 20, 1944, now abandoned; and in application S. N. 547,808 of R. H. Wiley and P. S. Pinkney, filed August 2, 1944 now abandoned. All of the above-numbered applications are assigned to the same assignee as is the present invention. A discussion of peroxide curing of saturated acrylic resins appears in Industrial and Engineering Chemistry, November 1944, page 1022 et sec.

It is to be understood that many different methods for practicing this invention will readily occur to those who are skilled in the art. The invention is therefore limited only as set forth in the following claims.

I claim:

1. A process for preparing cured polymeric materials which comprises subjecting a pre-existing substantially saturated uncured resin of the class consisting of chlorinated normally solid ethylene polymer and chlorosulfonated normally solid ethylene polymer, to the action of about 1% to 20% by weight of an organic peroxy compound at a temperature within the range of 100° to 160° C. under a pressure of 10 to 2,000 pounds per square inch above atmospheric pressure, and continuing the said heating until a cured resin which is virtually insoluble in common organic solvents is obtained.

2. The process set forth in claim 1 in which the organic peroxy compound is benzoyl peroxide.

3. A molded organic peroxide-cured resin of the class consisting of chlorinated normally solid ethylene polymer and chlorosulfonated normally solid ethylene polymer, said peroxide-cured resin being obtained in accordance with the process set forth in claim 1.

4. An organic peroxide-cured resin of the class consisting of chlorinated normally solid ethylene polymers and chlorosulfonated normally solid ethylene polymers.

DANIEL E. STRAIN.

REFERENCES CITED

The following references are of record in the file of this patent:

UNITED STATES PATENTS

| Number | Name | Date |
|---|---|---|
| 2,155,590 | Garvey | Apr. 25, 1939 |
| 2,249,498 | Schulze | July 15, 1941 |
| 2,318,959 | Muskat | May 11, 1943 |
| 2,320,536 | Pollack | June 1, 1943 |
| 2,332,974 | Lytton | Oct. 26, 1943 |
| 2,361,055 | Pollack | Oct. 24, 1944 |
| 2,442,330 | Fuller | June 1, 1948 |

OTHER REFERENCES

Mast: Ind. and Eng. Chem., vol. 36, pp. 1022–1027, Nov. 1944.